(No Model.)
C. WISDON.
DEVICE FOR CATCHING ANIMALS.
No. 407,426. Patented July 23, 1889.
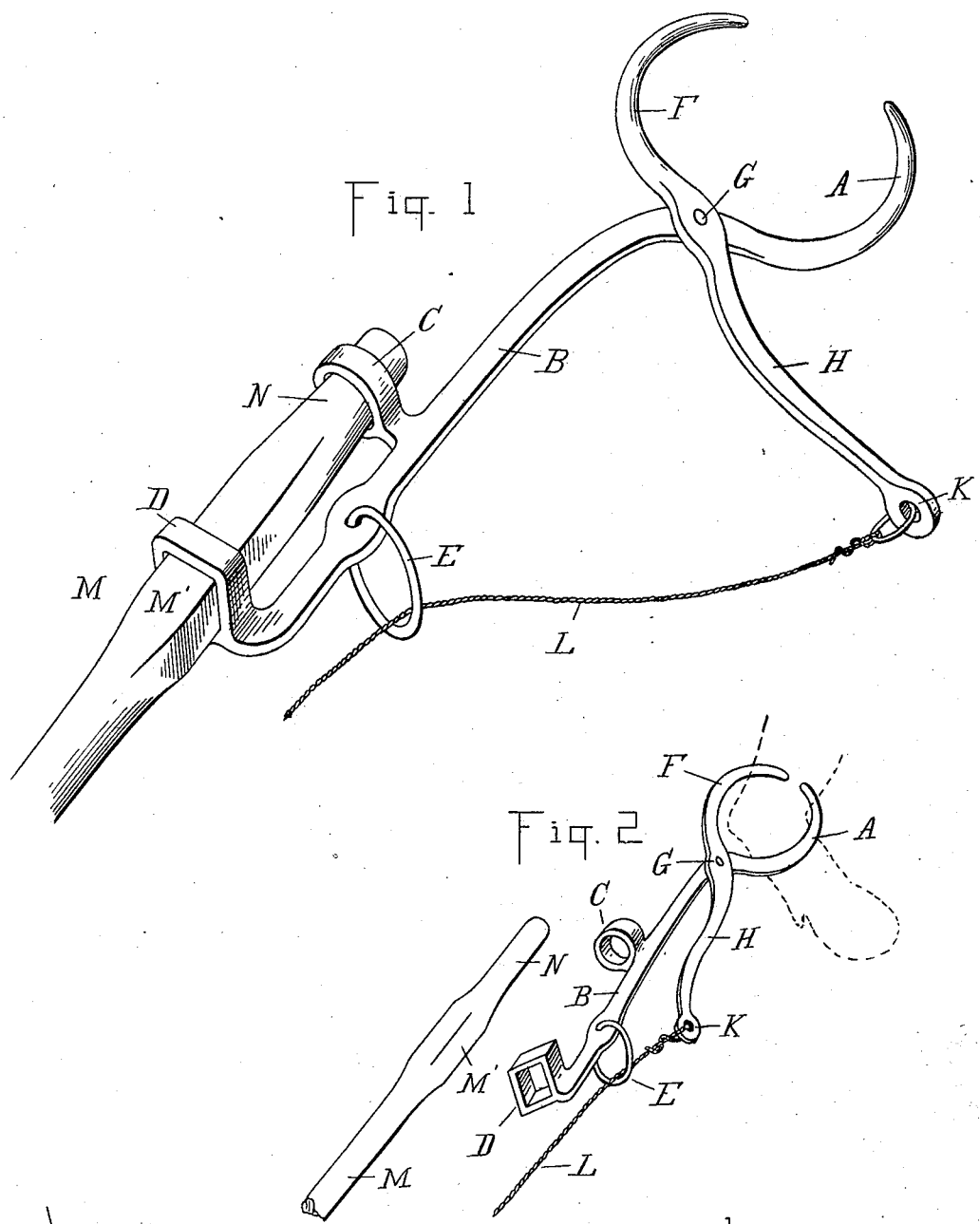
Witnesses:
P. M. Hulbert
J. Paul Mayer
Inventor:
Clayton Wisdon
By Thos. S. Sprague & Son
Att'y.

UNITED STATES PATENT OFFICE.

CLAYTON WISDON, OF FLAT ROCK, MICHIGAN.

DEVICE FOR CATCHING ANIMALS.

SPECIFICATION forming part of Letters Patent No. 407,426, dated July 23, 1889.

Application filed March 11, 1889. Serial No. 302,774. (No model.)

*To all whom it may concern:*

Be it known that I, CLAYTON WISDON, a citizen of the United States, residing at Flat Rock, in the county of Wayne and State of Michigan, have invented certain new and useful Improvements in Animal-Catchers, of which the following is a specification, reference being had therein to the accompanying drawings.

This invention relates to new and useful improvements in animal-catchers; and the invention consists in the peculiar construction and arrangement of the parts, all as more fully hereinafter described, and shown in the accompanying drawings, in which—

Figure 1 is a perspective view of my device as ready for use. Fig. 2 shows the device as fastened to the foot of the animal, the handle being detached therefrom.

A is a circular stationary jaw provided with the rearwardly-projecting shank B.

C is a circular socket, and D is a square socket formed a little distance apart in one side of the shank near the rear end thereof.

E is a ring secured to the shank to project on the opposite sides of the sockets.

F is a movable jaw of circular form and pivotally secured at G to the stationary jaw. It is provided with a shank H, terminating in an eye $k$, to which the rope L is secured, and which passes through the ring E.

M is a pole provided near its end with a square portion M', and the round portion N adapted to engage, respectively, into the sockets D and C.

In practice, the parts being arranged and constructed as shown and described, they are intended to operate as follows: By opening the movable jaw F the free ends of the jaws are sufficiently parted to be engaged upon the leg of an animal; then by a quick pull with the rope L the jaws are closed to hold the leg of the animal. Now, as the animal tries to escape, it will be readily seen that by holding on to the rope, and by giving at the same time a slight rearward jerk at the pole, the latter becomes readily disengaged from its sockets, and the operator, by holding on to the rope, has full control of the animal without being encumbered by the pole. I construct the pole with the round portion N tapering so that it cannot be pushed through the socket any farther than shown. At the same time the square portion M' fits loosely into the socket D, whereby the pole may be readily disengaged from the sockets.

In catching animals in confined places it is difficult to manage a long pole, and therefore the readiness with which I can detach mine or at the same time operate the device with it will be found of great advantage. A further advantage is obtained by the arrangement of the jaws, which, as will be seen, open out wide on a direct line with the shank B, or nearly so, so that the implement may be used to great advantage by thrusting it against the animal's legs.

What I claim as my invention is—

1. In an animal-catcher, the combination of the stationary jaw A, provided with the shank B, and having the round and square sockets C and D formed therein, the pole M, with its end formed to detachably engage in the round socket and at a distance from the end with a squared portion to engage the square socket, the ring E, and the movable jaw F, provided with the shank H and rope L, all arranged and combined to operate substantially as described.

2. An animal-catcher consisting of the shank B, formed with curved jaw A, and with a square socket D at the end and a round socket C between the ends, the ring E on the shank between the sockets, the movable jaw pivoted to the stationary jaw and provided with a shank, the rope L, and the pole formed at its end with a tapering round portion and at a distance from the tapered end with a squared portion, substantially as shown and described.

In testimony whereof I affix my signature, in presence of two witnesses, this 1st day of February, 1889.

CLAYTON WISDON.

Witnesses:
J. PAUL MAYER,
P. M. HULBERT.